United States Patent [19]

Heid

[11] Patent Number: 4,881,765
[45] Date of Patent: Nov. 21, 1989

[54] EXIT DEVICE HAVING LENGTH ADJUSTMENT MEANS FOR ITS CONCEALED VERTICAL RODS

[75] Inventor: George E. Heid, Charlotte, N.C.

[73] Assignee: Yale Security Inc., Monroe, N.C.

[21] Appl. No.: 157,535

[22] Filed: Feb. 19, 1988

[51] Int. Cl.$^4$ .................................................. E05C 9/00
[52] U.S. Cl. .............................. 292/92; 292/DIG. 60; 403/59; 403/118; 403/381; 74/99 A; 74/110
[58] Field of Search .............. 74/99 A, 110; 403/59, 403/118, 381, 331; 70/92, 461; 292/341.18, 341.19, 16.60, 21, 92, DIG. 39, DIG. 40, 337

[56] References Cited

U.S. PATENT DOCUMENTS

| | | | |
|---|---|---|---|
| 834,716 | 10/1906 | Flanders | 292/DIG. 60 X |
| 1,033,151 | 7/1912 | Butler | 292/21 |
| 1,390,519 | 9/1921 | Evans | 292/341.18 |
| 1,691,655 | 11/1928 | Hopkins | 292/21 |
| 1,721,489 | 7/1929 | Prinzler | 92/92 X |
| 2,887,336 | 5/1957 | Meyer | 292/21 |
| 3,633,389 | 1/1972 | Horgan, Jr. | 292/337 X |
| 3,660,940 | 5/1972 | Tavano | 292/92 X |
| 3,819,213 | 6/1974 | Vanderburgh | 70/92 X |
| 4,158,463 | 6/1979 | Henrichs | 292/341.18 |
| 4,598,939 | 7/1986 | Krupicka et al. | 292/92 |
| 4,601,499 | 7/1986 | Kim | 292/36 |

FOREIGN PATENT DOCUMENTS

| | | |
|---|---|---|
| 1907684 | 8/1970 | Fed. Rep. of Germany ... 292/DIG. 60 |
| 1964842 | 8/1971 | Fed. Rep. of Germany ... 292/DIG. 60 |
| 2222839 | 11/1973 | Fed. Rep. of Germany ........ 70/461 |
| 2504420 | 8/1976 | Fed. Rep. of Germany ... 292/DIG. 60 |
| 3330245 | 4/1984 | Fed. Rep. of Germany ....................... 292/341.18 |

Primary Examiner—Gary L. Smith
Assistant Examiner—Eric K. Nicholson
Attorney, Agent, or Firm—Dallett Hoopes

[57] ABSTRACT

The vertical slide in the latch linkage of an exit device is coupled for vertical movement together with a channel inside the door stile. The channel holds a pair of blocks having inclined surfaces held in touching relation and relatively slideable. The vertical latch-operating rod is attached to the first of the blocks and the other block is secured to the channel by a horizontally disposed threaded adjusting element. The side walls of the channel restrict the first of the blocks from lateral but not vertical movement. The other block is restricted from lateral movement only by the threaded element, and turning the threaded element moves that block from side to side in the channel to raise or lower the first block as the inclined surfaces slide. This changes the effective length of the rod. The turning of the threaded element may be done from the outside of the door through an access hole.

5 Claims, 2 Drawing Sheets

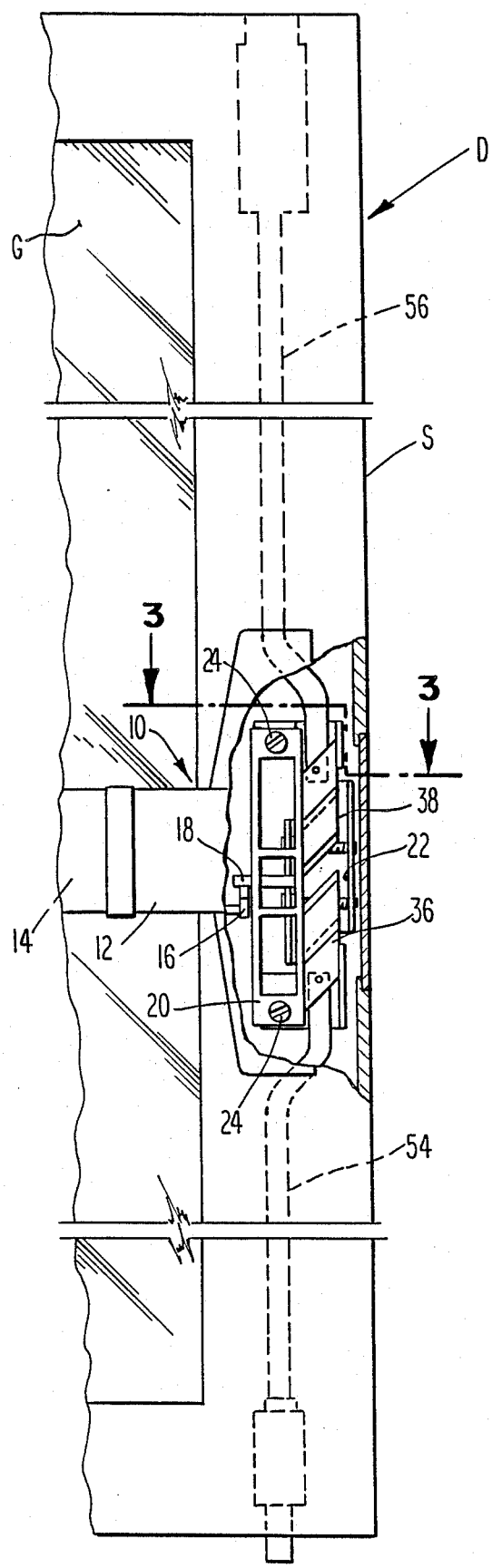
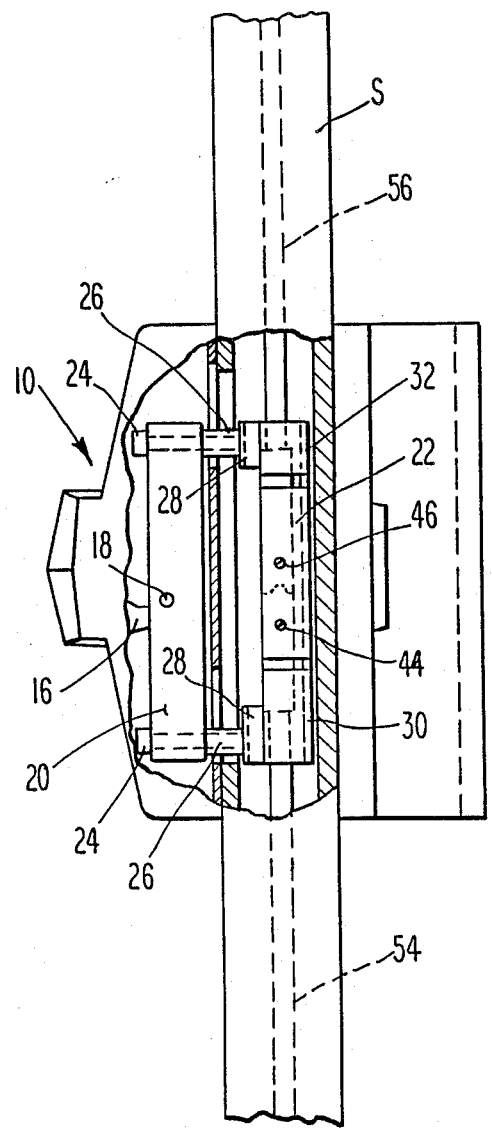

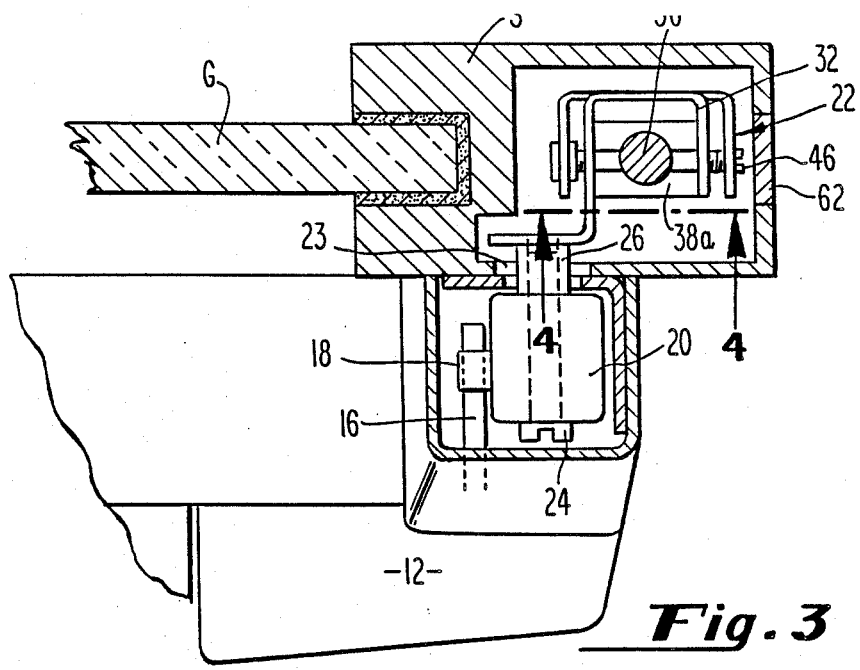
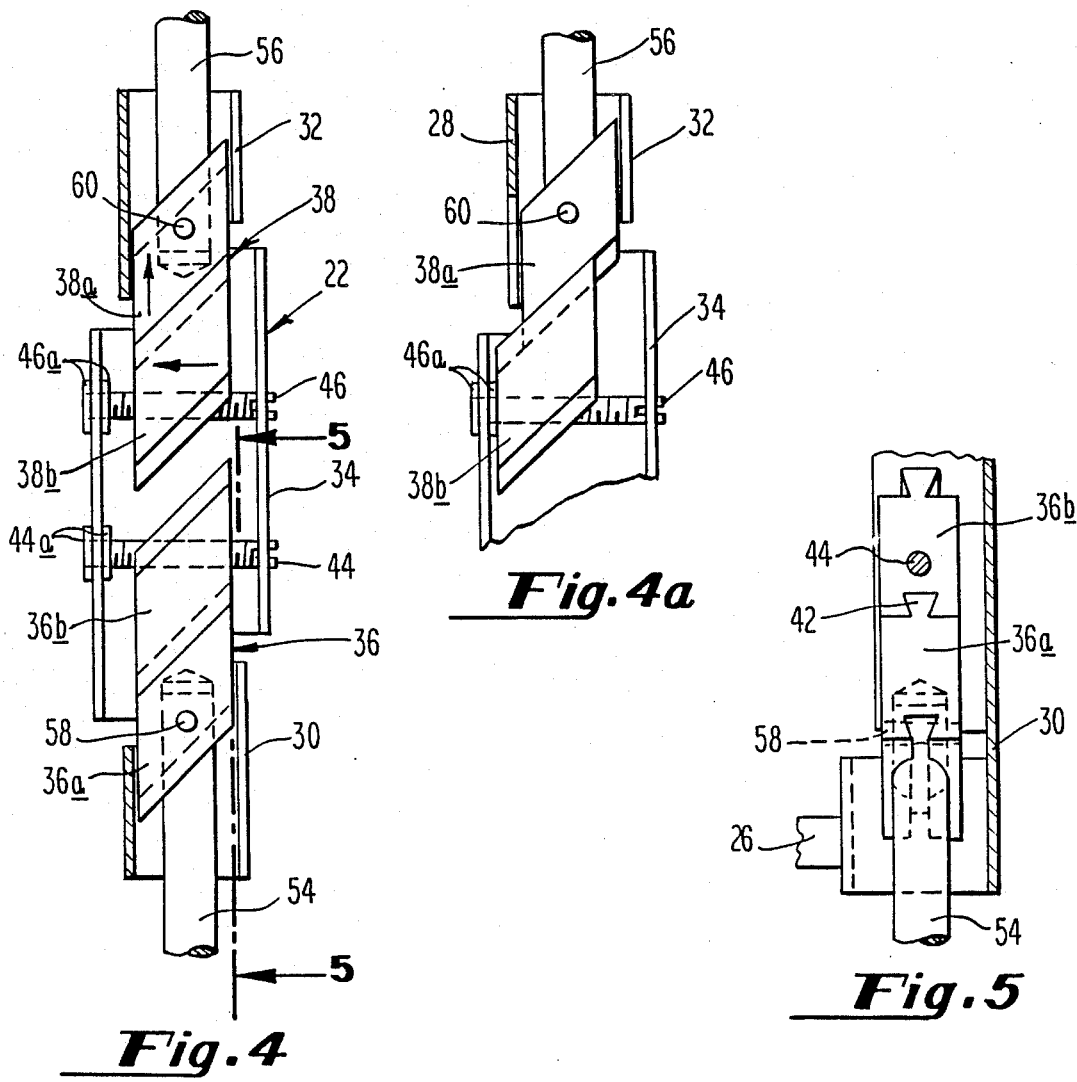
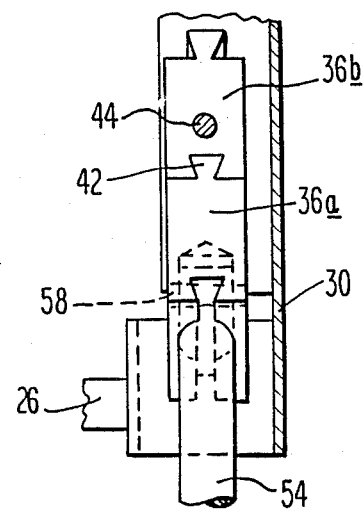

EXIT DEVICE HAVING LENGTH ADJUSTMENT MEANS FOR ITS CONCEALED VERTICAL RODS

BACKGROUND OF THE INVENTION

1. Field of the Invention

This invention relates to an exit device having vertical rods which operate the upper and lower latches. More specifically, this invention relates to an exit device in which the vertical rods are concealed within the door stile. The present invention provides means for adjusting the effective length of the rods without removing the door from its hinges or removing the exit device from the door.

2. Description of the Related Art and Information Disclosed in §§1.97-1.99

The prior art includes the U.S. Pat. No. 2,887,336 to Meyer, which was granted May 19, 1959, in which an exit device is provided with a lengthy escutcheon which upon removal exposes adjustment means for the length of the vertical rods which drive the upper and lower latches on the door. The adjustment means in the Meyer patent includes overlapping plates having interfitting sawtoothed surfaces and a clamping screw holding the plates together so that the overlapping sections have the desired degree of overlap to give the proper effective length to the vertical rod. (A copy of the Meyer patent is enclosed in accordance with §197.)

SUMMARY OF THE INVENTION

Under the present invention the exit device drives the conventional vertical slide in the latch housing. To the slide the vertical rods are attached for driving upper and lower latches. The present invention involves a modification to the slide, mounting on it a channel disposed inside the stile of the door. For each rod the channel embraces blocks having interfitting inclined surfaces. One of the blocks is attached to the channel and moves therewith, and the other is attached to the end of the rod. Because the surfaces are inclined, horizontal movement laterally of one of the blocks with respect to the other raises or lowers the other block and hence changes the effective length of the related vertical rod.

Means for moving the laterally movable block comprises a threaded element. The threaded element has a slotted head accessible upon removal of a cover plate in the end surface of the door.

BRIEF DESCRIPTION OF THE DRAWINGS

Other objects and features of the invention will be clear from a reading of the following specification including the drawings, all of which disclose a non-limiting form of the invention. In the drawings:

FIG. 1 is a front fragmentary elevational view of the end of a door having an exit device embodying the invention installed thereon. A portion of the door stile is broken away to show parts of the adjustment means of the invention;

FIG. 2 is a fragmentary side view having a portion of the stile broken away;

FIG. 3 is an enlarged sectional view taken on the line 3—3 of FIG. 1;

FIG. 4 is a sectional view taken on the line 4—4 of FIG. 3;

FIG. 4a is a fragmentary view similar to FIG. 4 but showing the laterally movable block in a different lateral position to show how the length of the related rod is effectively changed; and FIG. 5 is a sectional view taken on the line 5—5 of FIG. 4.

DESCRIPTION OF THE PREFERRED EMBODIMENT

In FIG. 1 the end of the door D comprises a hollow vertical stile S framing a glass center panel G. The exit device embodying the invention is generally designated 10 and comprises the latch housing 12 and the push bar 14. The housing 12 includes linkages which convert the inward movement of the push bar 14—as would happen when one tries to exit through the door—to retract the latches. Such linkages are well known in the art. They do not constitute part of this invention.

Specifically, the linkages drive a finger 16 which, upon the occurrence of a push on the push bar 14, is pivoted by the aforementioned linkage to raise the pin 18 fixed to the slide or slider 20. The slide is a conventional part of an exit device having vertical rods, and is well disclosed in the art as, for example, in U.S. Pat. No. 4,598,939, which issued to Krupica et al. on July 8, 1986, and U.S. Pat. No. 3,819,213, which issued June 25, 1974 to George W. Vanderburg.

The slide 20 is mounted for vertical reciprocation by means not shown in FIG. 1. A channel 22 is bolted to the ends of the slide 20 by bolts 24. The channel is disposed inside the door stile and held, through appropriate apertures 23 in the side wall of the stile, spaced from the slide by cylindrical spacers 24. As is better shown in FIGS. 3 and 4, the channel 22 is irregular in width as will be explained and has spaced arms 28 disposed bent at right angles. It is by these arms that the bolts 24 hold the bracket as a unit with the slide 20.

More specifically, the channel 22 has three separate trough-like sections, a lower trough 30 and an upper trough 32 from the side walls of which the arms 28 extend. Finally, there is an intermediate trough 34 of greater width than the other two. The entire bracket, despite its division into three separate segments, is formed from a single metal plate.

In the channel 22 are disposed two sets 36 and 38 of relatively movable inclined blocks. Preferably the blocks are each of rhomboid shape. Each block has a dovetail-type groove 40 and a dovetail type tongue 42 (FIG. 5). These interfitting parts are shaped so that there is easy, relative lateral movement between the inclined contiguous surfaces. For simplicity in assembly and manufacture the blocks are identical, but only the contiguous grooves or tongues are used.

Each of the sets 36 and 38 of interfitting blocks comprises one block 36a and 38a, which is held in the lower or upper channel section 30, 32 respectively against lateral movement by the adjacent side walls of the channel section. The other blocks 36b and 38b of the respective sets are disposed in the wide channel section 34 and permitted lateral movement because the side walls of the section 34 are considerably wider-spaced than the width of the blocks. The lateral or horizontal movement of blocks 36b and 38b is controlled by the respective threaded elements 44 and 46, which extend threadedly through the respective blocks.

As a result of this structure, when one of the threaded elements 44 or 46 is rotated as by a technician's screw driver. the associated block 36b or 38b moves laterally within the channel section 34. Because the other blocks 36a, 38a in the respective sets are held against lateral movement by walls of the narrower channel sections 30, 32 but are permitted vertical movement, they raise or lower as the tongued and grooved contiguous surfaces of the set slide relatively (FIG. 4a). Thus, the movement of the block 38b to the left, as when the threaded element 46 is turned counterclockwise, for instance, raises the block 38a.

The outer blocks 36a and 38a are drilled at their lower and upper end surfaces respectively, and the lower vertical rod 54 and the upper rod 56 are inserted in the drillings respectively and pinned as by pins 58 and 60 extending through smaller transverse drilled holes into the sides of the blocks 36a and 38a. The end result is that the length of the upper rod 56, for instance, may be reduced by rotating the threaded element 42 clockwise, causing the block 38b to move rightward (FIG. 4), lowering block 38a. By the same token, and oppositely, by rotating threaded element 44 clockwise, block 36b may be drawn rightward to lower block 36a and effectively lengthening the lower rod 54.

It should be understood that the threaded elements 44 and 46 described are right-hand threads and are disposed in ample unthreaded openings in the side walls of trough 34, and flanges or lock nuts on the elements, such as at 44a and 46a, keep the threaded elements 44 and 46 from moving laterally in their openings as they are turned.

For access to the threaded elements 44 and 46, the end surface of the door is provided with an access plate 62 (FIG. 1) held in position by fasteners (not shown).

It should be noted that the rods 54 and 56 include a "dog leg" which puts the main part of each rod in line with the slider 20 to minimize the stress in the operation of the exit device.

In operation, once the exit device, including the concealed rods 54 and 56, is roughly adjusted and installed in the door and the door is installed in its frame along with a conventional upper and lower keeper and latch hole respectively, final adjustment of the vertical rods 54 and 56 may be made by opening the access plate 62 and with a screw driver and the like rotating the threaded elements 44 and 46 as necessary to provide fine adjustment of the length of the vertical rods.

The upper latch mechanism, as well as the lower latch, is not part of the present invention and need not be described. It will be clear to those in the art, however, that effective length of the rod 56 will control the point at which the upper latch closes on its keeper, and the effective length of the rod 54 will assure that the end 54a will be cammed upward properly as the door closes and engages its lower strike and thereafter end 54a will drop into its latch hole.

As an example and to give an idea of the practical importance of the invention, the length of a vertical rod can be effectively adjusted in typical installation by having the length adjustable in a range of three-eighths of an inch. In other words, for instance, if from the position of the blocks in FIG. 4a to their positions when block 38b is moved all the way to the right, the rod changes in length by three-eighths inches in length, that is satisfactory in practice. Obviously this is not a firm limitation, but this has been found to fulfill requirements in actual practice.

It will also be clear that once the exit device of the invention is installed on a door mounted in a frame, it will not be necessary to remove the door in order to adjust the vertical rods as had been the case in the past. Instead, they can be adjusted in effective length by rotating the threaded elements 40 and 42 by a screw driver, for instance, once the access cover 62 is removed. The operation of the push bar 14 and the consequent raising and lowering of the slide 20 and channel 22 is not affected by the length or change in length of the vertical rods 54, 56.

It will be clear to those in the art the present invention is a beneficial step forward in an area where there has been a longfelt need. Further, while the invention has been disclosed in only one form, it is not so limited but may take a number of modifications and variations not disclosed herein. Hence, the present invention is not of such limited scope but may be defined by the following claim language, including equivalents thereof.

I claim:

1. An exit device having a push bar and a slide adjacent the bar adapted to move vertically when the bar is pressed, the device being mounted waist high on a door having a hollow stile formed with an aperture adjacent the slide, a vertically disposed channel in the stile secured through the aperture to the slide, a pair of blocks disposed in the channel having inclined engaging surfaces, retaining means to retain the engaging surfaces in slidable contact, wall means on the channel holding the first block against horizontal movement, threaded means in the channel holding the second block from moving vertically relative to the channel and for adjusting the position of the second block in a horizontal direction to raise or lower the first block, a vertical rod having an end attached to the first block, the other end of the vertical rod adapted to drive a latch on the door remote from the device.

2. An exit device as claimed in claim 1 wherein the retaining means are in the form of dovetail tongue-in-groove shapes in the blocks.

3. An exit device as claimed in claim 1 wherein the threaded means comprises an elongate threaded element extending between side walls of the channel and engaging a threaded transverse opening in the second block.

4. An exit device as claimed in claim 1 wherein the threaded means is accessible to the outside of the door at the end of the door.

5. An exit device as claimed in claim 1 wherein the channel contains two cooperant pairs of blocks each associated with a vertical rod, one driving an upper latch, and one driving a lower latch.

* * * * *